United States Patent [19]

Sweeney et al.

[11] Patent Number: 5,103,915
[45] Date of Patent: Apr. 14, 1992

[54] WELLHEAD HOUSING SEAL ASSEMBLY FOR DAMAGED SEALING SURFACES

[75] Inventors: Thomas F. Sweeney, Newbury Park; Karl Schnakenburg, Ventura, both of Calif.

[73] Assignee: ABB Vetco Gray Inc., Houston, Tex.

[21] Appl. No.: 670,130

[22] Filed: Mar. 15, 1991

Related U.S. Application Data

[63] Continuation-in-part of Ser. No. 570,119, Aug. 17, 1990, abandoned.

[51] Int. Cl.⁵ .......................... E21B 33/03; F16J 15/08
[52] U.S. Cl. ...................... 166/379; 166/82; 277/167.5; 277/236; 285/334.2
[58] Field of Search .................. 166/195, 82, 87, 85, 166/123, 125, 339, 308, 379; 277/167.5, 225, 236; 285/334.2, 363, 917

[56] References Cited

U.S. PATENT DOCUMENTS

| | | |
|---|---|---|
| 3,062,565 | 11/1962 | Word . |
| 3,507,506 | 4/1970 | Tillman, III .......................... 277/225 |
| 3,556,568 | 1/1971 | King . |
| 3,749,426 | 7/1973 | Tillman, III . |
| 4,214,763 | 7/1980 | Latham ............................ 277/167.5 |
| 4,471,965 | 9/1984 | Jennings et al. ..................... 277/236 |
| 4,474,381 | 10/1984 | Wilkins et al. ....................... 277/236 |
| 4,563,025 | 1/1986 | Poe ..................................... 277/236 |
| 4,709,933 | 12/1987 | Adamek et al. . |
| 4,867,483 | 9/1989 | Witt et al. . |
| 4,913,464 | 4/1990 | Taylor et al. ..................... 285/334.2 |
| 5,039,140 | 8/1991 | Szymczak . |

Primary Examiner—Ramon S. Britts
Assistant Examiner—Frank Tsay
Attorney, Agent, or Firm—James E. Bradley

[57] ABSTRACT

A seal assembly for a wellhead housing and wellhead connector will seal even if the primary sealing surface becomes damaged. The wellhead connector and the wellhead housing each have primary sealing surfaces. A seal ring with upper and lower conical surfaces will seal against the surfaces of the wellhead connector and the wellhead housing. The wellhead housing also has a secondary sealing surface that extends down from the primary sealing surface. In the event that the primary sealing surface becomes damaged, a seal is utilized that has a support section and a lower seal surface. The support section does not sealingly contact the damaged primary seal surface on the wellhead housing. The lower seal surface engages the secondary seal surface of the wellhead housing to perform sealing.

19 Claims, 3 Drawing Sheets

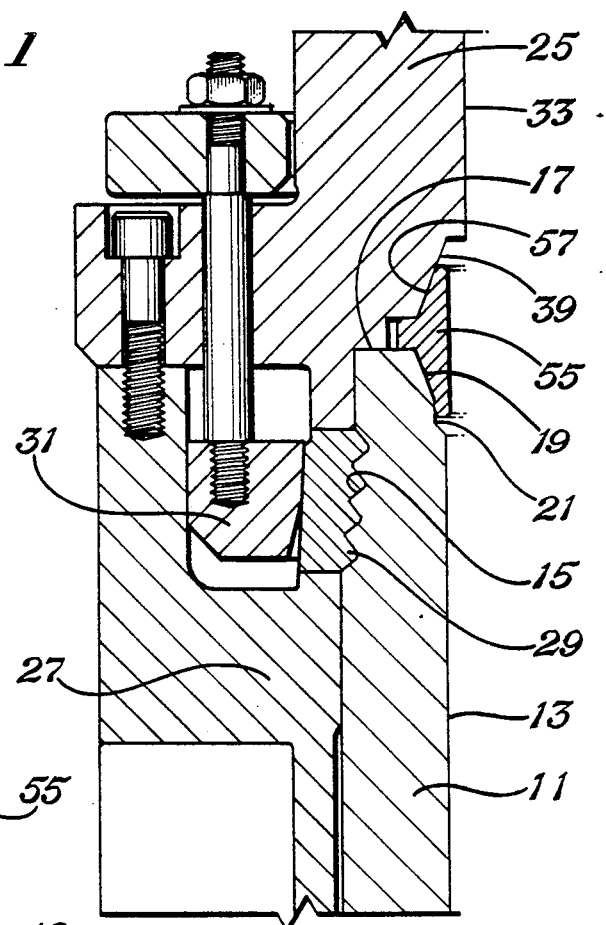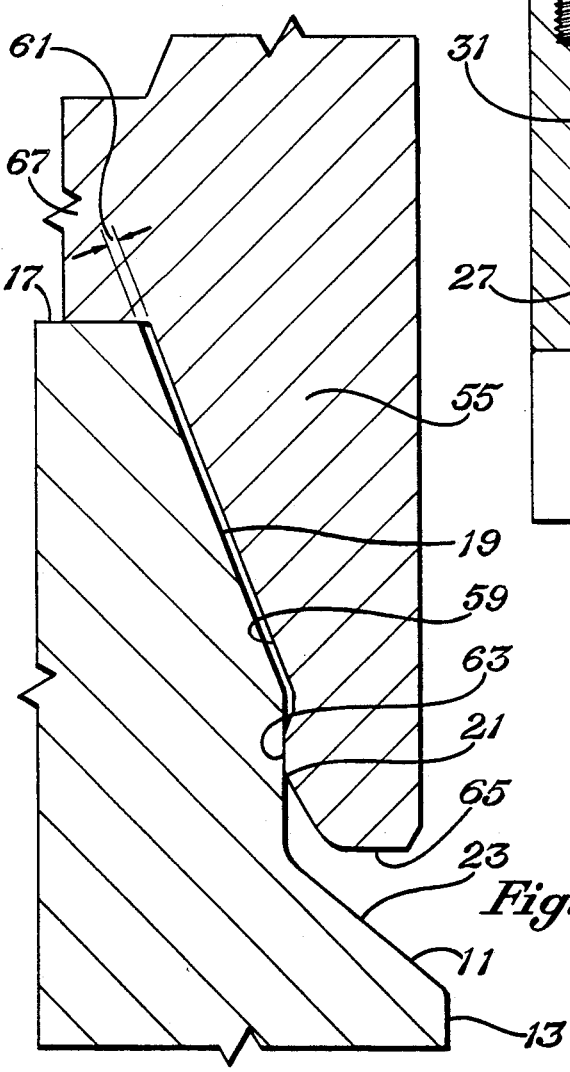

WELLHEAD HOUSING SEAL ASSEMBLY FOR DAMAGED SEALING SURFACES

CROSS REFERENCE TO RELATED APPLICATION

This application is a continuation-in-part of application Ser. No. 07/570,119, filed Aug. 17, 1990 now abandoned, Thomas F. Sweeney, "WELLHEAD HOUSING SEAL ASSEMBLY FOR DAMAGED SEALING SURFACES".

BACKGROUND OF THE INVENTION

1. Field of the Invention

This invention relates in general to subsea wellhead housings and wellhead connectors, and in particular to a seal assembly that will provide sealing if the wellhead housing conical sealing surface becomes damaged.

2. Description of the Prior Art

A subsea well of the type concerned herein has a wellhead housing located at the subsea floor. The wellhead housing is a tubular member having a bore. A wellhead connector will be lowered from a vessel at the surface over the wellhead housing to connect the subsea well to the surface. The wellhead connector has connection means for connecting to the exterior of the wellhead housing.

The wellhead housing has an upward facing shoulder on its upper end that is engaged by a downward facing shoulder on the lower end of the wellhead connector. The wellhead housing has a conical upward facing shoulder at its upper end. The wellhead connector has a conical downward facing shoulder. The wellhead connector also has a recess located radially inward from the downward facing shoulder.

A metal seal locates between the wellhead connector and the wellhead housing. The metal seal has a conical upper surface that seals against the conical surface of the wellhead connector. The metal seal has a lower conical surface that seals against the conical surface of the wellhead housing. A rib extends radially outward from the two conical surfaces for location in the recess.

While the metal seal works well, if the conical surface of the wellhead housing becomes damaged, problems will occur. The metal seal will not seal against the damaged lower surface. The wellhead housing is cemented in the ground and connected to casing and conductor pipe. It is not possible to pull the wellhead housing from the subsea floor for redressing the conical sealing surface.

SUMMARY OF THE INVENTION

In one embodiment of this invention, the subsea wellhead housing has a secondary sealing surface machined below its conical primary sealing surface during manufacturing. This secondary sealing surface extends downward and is of a greater diameter than the bore.

A conventional metal seal will locate between the wellhead housing and the wellhead connector. The conventional seal will seal against the primary sealing surface of the wellhead housing. The secondary sealing surface need not be used so long as the wellhead housing primary sealing surface is in good condition.

In the event that the wellhead housing primary sealing surface becomes damaged, then a second seal ring will be utilized in lieu of the first seal ring. The second seal ring has a support surface that leads to a secondary surface. The secondary surface is cylindrical in one embodiment and sized to seal against the secondary surface in the wellhead housing.

The support surface on the second seal ring is sized so that it will be spaced by a slight gap from the damaged primary sealing surface of the wellhead housing. As a result, a good seal between the wellhead housing wellhead connector will be maintained without the need for attempting to redress the wellhead housing primary sealing surface.

In a second embodiment, the secondary seal surfaces is also conical, rather than cylindrical, but at a lesser angle relative to vertical than the primary seal surface. The wellhead housing thus has a primary conical sealing surface at one angle leading into a secondary conical sealing surface at another angle.

BRIEF DESCRIPTION OF THE DRAWINGS

FIG. 1 is a partial vertical sectional view illustrating a wellhead housing and wellhead connector with a seal assembly constructed in accordance with this invention.

FIG. 2 is an enlarged, partial sectional view of a portion of the seal assembly of FIG. 1.

DETAILED DESCRIPTION OF THE INVENTION

Figure 3:
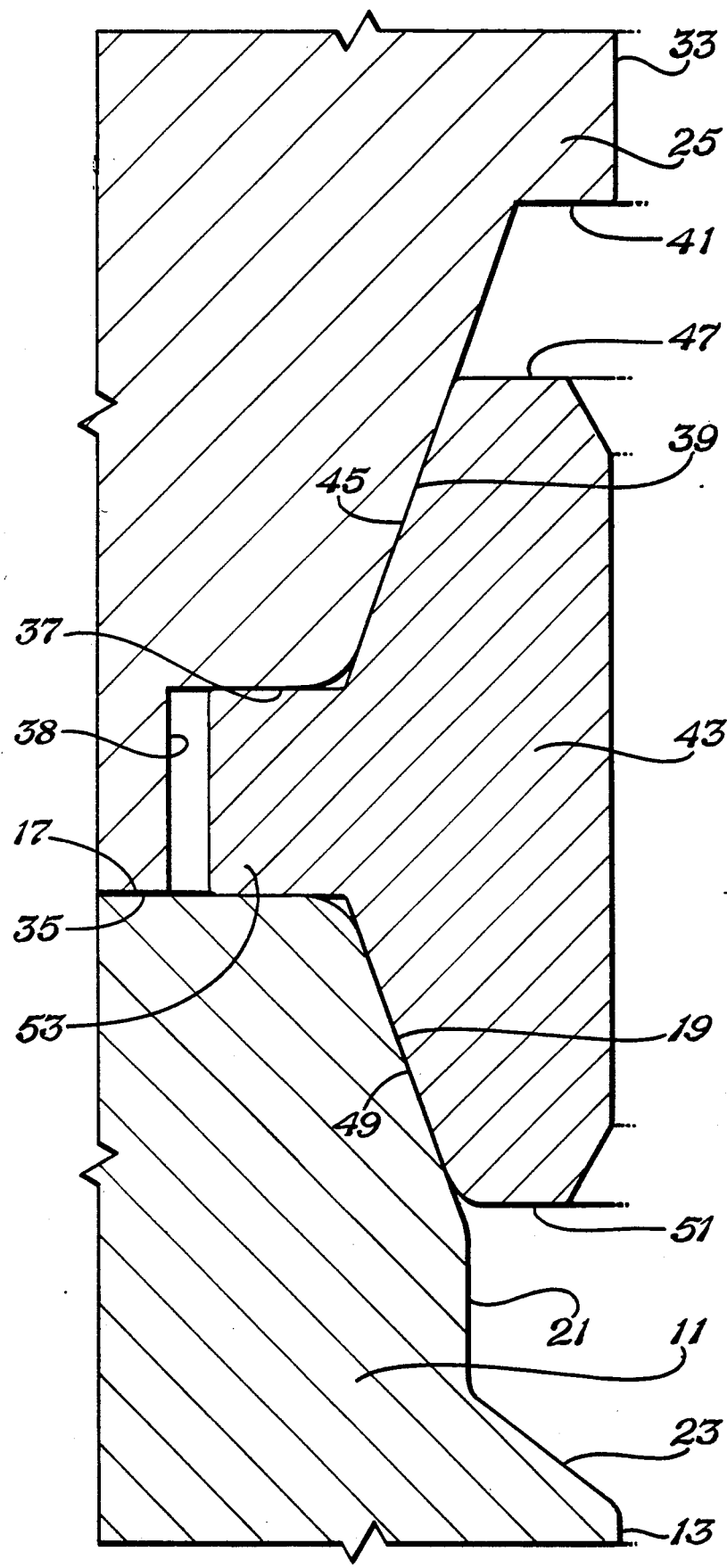
FIG. 3 is an enlarged, partial sectional view of the seal assembly of FIG. 2, but showing a conventional seal in place.

Referring to FIG. 1, subsea wellhead housing 11 has a bore 13. The exterior of the wellhead housing 11 has grooves 15. The upper end of wellhead housing 11 has an upward facing shoulder 17. Upward facing shoulder 17 is perpendicular to the axis of bore 13. A conical primary sealing surface 19 extends downward and inward from the upward facing shoulder 17.

Referring to FIG. 2, primary seal surface 19 has a lower marginal edge that joins a secondary seal surface 21 that is cylindrical in the embodiment of FIGS. 1-3. Secondary seal surface 21 has a common axis with the axis of bore 13, and has a greater diameter than bore 13. The lower marginal edge of secondary seal surface 21 joins a transition surface 23. The axial extent of the secondary seal surface 21 is considerably less than the axial extent of the primary seal surface 19. Transition surface 23 is also a conical surface, but at a lesser inclination relative to horizontal than primary seal surface 19. Transition surface 23 has a lower edge that joins bore 13.

Referring again to FIG. 1, a wellhead connector 25 will connect to the wellhead housing 11. Wellhead connector 25 is conventional, having a lower portion 27 that slides over the exterior of wellhead housing 11. A plurality of dogs 29 will move radially into engagement with grooves 15 to connect the wellhead connector 25 with the wellhead housing 11. A cam ring 31 driven by other equipment (not shown) moves up and down to move the dogs 29 into engagement with grooves 15, and to allow them to retract.

Wellhead connector 25 has a bore 33 that will be coaxial with bore 13 when wellhead connector 25 connects to the wellhead housing 11. A downward facing shoulder 35 of the wellhead connector 25 will contact and bear against the upward facing shoulder 17 of wellhead housing 11.

Referring to FIG. 3, which shows portions of the wellhead connector 25 enlarged, a recess 37 locates radially inward from the wellhead connector downward facing shoulder 35. Recess 37 has an outer wall 38 that is cylindrical and coaxial with wellhead connector bore 33. A conical surface 39 extends upward and inward from recess 37. Conical surface 39 has an upper marginal edge that joins a transition shoulder 41. Transition shoulder 41 is perpendicular to the axis of bore 33.

FIG. 3 shows a first annular seal ring 43 located between the wellhead connector 25 and wellhead housing 11. Seal ring 43 is conventional, having an upper conical surface 45 that sealingly engages the wellhead housing conical surface 39. Seal ring 43 has an upper edge 47 that terminates a distance below the transition shoulder 41.

Seal ring 43 has a lower conical surface 49 on its outer side that mates sealingly with the wellhead housing primary seal surface 19. Lower conical surface 49 terminates in a lower edge 51 that is spaced above the secondary seal surface 21. A rib 53 extends radially outward on the exterior of seal ring 43. Rib 53 locates in the recess 37. The outer side of rib 53 will be located inward from the recess outer wall 38.

Seal ring 43 is of metal. It is constructed so that the upper conical surface 45 and the lower conical surface 49 interferingly engage the conical surfaces 39, 19, respectively. The interference causes elastic and permanent yielding when the wellhead connector 25 connects to the wellhead housing 11. The elastic yielding of the seal ring 43 provides the necessary sealing between the conical surfaces 45 and 39 and conical surfaces 49 and 19. The secondary seal surface 21 will perform no function at all when the seal ring 43 is utilized.

In the event that the primary seal surface 19 becomes damaged such that it will be difficult to maintain a good seal, then a second seal ring 55, shown in FIGS. 1 and 2, will be utilized. Seal ring 55 may be conventional on its upper side, but differs on its lower side. It has an upper conical sealing surface 57 that is sized to interferingly engage and seal against the wellhead housing conical surface 39. Its upper edge will be spaced below the transition shoulder 41 (FIG. 3).

Seal ring 55 has a support section 59 that is conical and inclines at the same angle as the wellhead housing primary seal surface 19. However, it will be manufactured such that it will not seal against the primary seal surface 19. Rather, a slight gap 61 will exist to prevent sealing contact. Under sufficient load, part of the support section 59 may touch a portion of the primary seal surface 19, but not sufficiently to cause a seal. The support section 59 will not have a larger diametrical dimension than the primary seal surface 19.

The seal ring 55 has a lower seal surface 63 which is cylindrical in the embodiment of FIGS. 2 and 3 and dimensioned to sealingly mate with the secondary seal surface 21. Lower seal surface 63 has a diameter that is slightly greater than the diameter of the secondary seal surface 21. This creates an interference fit, causing elastic deflection of the seal ring 55. The lower end 65 of seal ring 55 locates above the transition shoulder 23. Seal ring 55 has a rib 67 which locates in the recess 37 (FIG. 3).

In operation, the seal ring 43 will be used normally. Sealing will occur between the conical surfaces 19 and 49, and the conical surfaces 39 and 45. There will be no sealing at the rib 53.

If the primary seal surface 19 becomes damaged, then seal ring 55 will be utilized. Its lower seal surface 63 will seal against the secondary seal surface 21. The upper conical surface 57 will seal against the conical surface 39 of the wellhead connector 25. Rib 67 will not perform any sealing, nor will support section 59.

Figure 4:
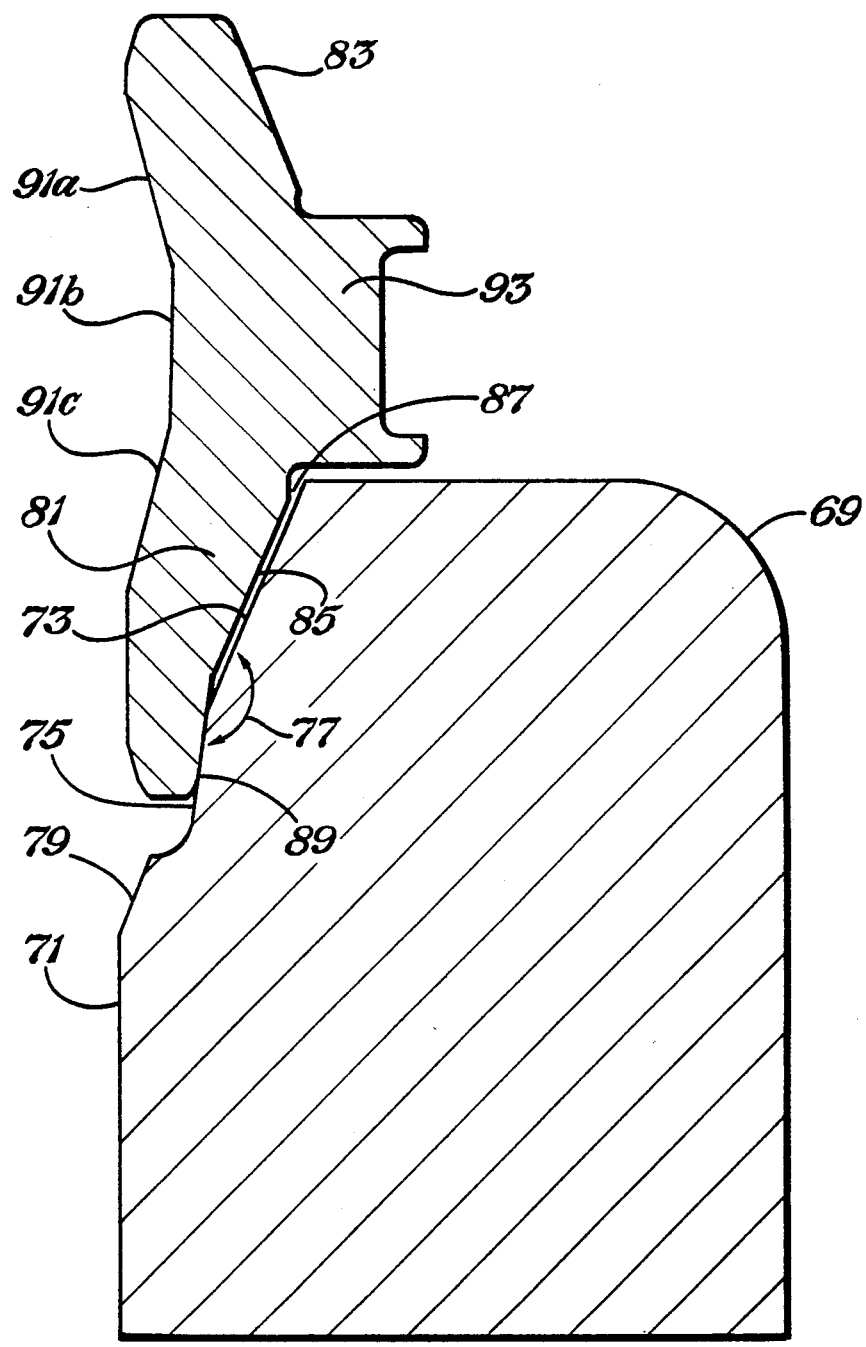
FIG. 4 is an enlarged, partial sectional view of an alternate embodiment of a seal assembly constructed in accordance with this invention.

In the alternate embodiment of FIG. 4, the wellhead housing 69 has an axial bore 71 with an axis. Primary seal surface 73 is conical, just as in the embodiment of FIGS. 2 and 3. Secondary seal surface 75, rather than being cylindrical as secondary seal surface 21 of FIGS. 2 and 3, is at a slight inclination. It is conical, but at a lesser angle relative to the axis of bore 71 than the angle of inclination of the primary seal surface 73.

Preferably, the primary seal surface 73 is at an angle of about 23 degrees relative to the axis of bore 71, while the secondary seal surface 75 is at an angle of about 10 degrees relative to the axis of bore 71. Primary seal surface 73 and secondary seal surface 75 intersect each other at an obtuse angle 77 that is less than 180 degrees. A transition section 79 extends below secondary seal surface 75 and joins the bore 71.

Seal ring 81 has an upper seal surface 83 that is the same as in the embodiment of FIGS. 2 and 3. A support section 85 extends downward, overlying the primary seal surface 73. Support section 85 is conical, at the same inclination as the primary seal surface 73. However, it is at a lesser dimension, resulting in a gap 87 to prevent sealing of the support section 85 against the primary seal surface 73. Under load, a portion of the support section 85 will deflect and touch the primary seal surface 73, but not enough to cause sealing.

A lower seal surface 89 extends downward from the support section 85. Lower seal surface 89 inclines relative to the axis of bore 71 at the same inclination as the secondary seal surface 75. It is sized at a greater diameter so as to create an interference fit with the secondary seal surface 75.

Seal ring 81 has an inner diameter with an upper portion 91a that is conical and leads to a central portion 91b that is cylindrical. The central portion 91b leads to a lower portion 91c that is conical. The central portion 91b is of greater diameter than the conical upper and lower portions 91a, 91c. This provides a recessed or concave inner diameter. This assists in the flexibility of seal ring 81.

Seal ring 81 operates in the same manner as seal ring 55. Because the secondary seal surface 75 is not quite cylindrical, rather at a slight conical angle, this provides greater ease in inserting the seal 81 into place. The recessed inner diameter provides additional flexibility over the seal of FIGS. 2 and 3.

The invention has significant advantages. The use of two separate seal rings and an additional secondary sealing surface allows a seal to be made even if the primary sealing surface becomes damaged.

While the invention has been shown in only one of its forms, it should be apparent to those skilled in the art that it is not so limited, but is susceptible to various changes without departing from the scope of the invention.

I claim:

1. In a wellhead housing of a type having a bore with an axis and an upward facing shoulder on its upper end, a wellhead connector adapted to connect to the wellhead housing and having a bore and a downward facing shoulder for contact with the upward facing shoulder, the wellhead connector having a recess located radially inward from the downward facing shoulder and a seal surface which extends upward and is inward from the recess, an improved apparatus for sealing the wellhead connector to the wellhead housing at the upward and downward facing shoulders, comprising in combination:

a primary seal surface extending downward from the upward facing shoulder of the wellhead housing and radially inward relative to the axis of the bore;

a secondary seal surface extending downward from the primary seal surface of the wellhead housing, the primary seal surface intersecting the secondary seal surface at an obtuse angle, the secondary seal surface having a lower marginal edge;

a transition surface extending inward from the lower marginal edge of the secondary seal surface to the bore of the wellhead housing;

an annular seal ring for use if the primary seal surface of the wellhead housing is damaged, comprising:

a upper seal surface in sealing contact with the seal surface of the wellhead connector;

a support section which is positioned adjacent the primary seal surface in the wellhead housing to prevent sealing contact with the primary seal surface;

a lower seal surface extending below the support section and which contacts the secondary seal surface in the wellhead housing in sealing engagement; and a rib extending radially outward from the support section into the recess.

2. The apparatus according to claim 1 wherein the secondary seal surface is conical and at a lesser angle relative to the axis of the bore than the primary seal surface.

3. The apparatus according to claim 1 wherein the secondary seal surface is substantially cylindrical.

4. The apparatus according to claim 1 wherein the lower seal surface of the seal ring terminates in a lower end that is spaced above the transition surface by a clearance.

5. The apparatus according to claim 1 wherein the upper seal surface of the seal ring is conical.

6. The apparatus according to claim 1 wherein the support section of the seal ring has an outer surface that is at the same inclination relative to the axis of the bore as the primary seal surface.

7. The apparatus according to claim 1 wherein the support section of the seal ring has an outer surface that is conical.

8. The apparatus according to claim 1 wherein the seal ring has an inner diameter that is generally concave.

9. In a wellhead housing of a type having a bore with an axis and an upward facing shoulder on its upper end, a wellhead connector adapted to connect to the wellhead housing and having a bore and a downward facing shoulder for contact with the upward facing shoulder, the wellhead connector having a recess located radially inward from the downward facing shoulder and a sealing surface which extends upward and is inward from the recess, an improved apparatus for sealing the wellhead connector to the wellhead housing at the upward and downward facing shoulders, comprising in combination:

a conical primary seal surface extending downward from the upward facing shoulder of the wellhead housing and radially inward relative to the axis of the bore;

a conical secondary seal surface extending downward from the primary seal surface of the wellhead housing at a lesser angle relative to the axis of the bore than the primary seal surface, the secondary seal surface having a lower marginal edge;

a transition surface extending inward from the lower marginal edge of the secondary seal surface to the bore of the wellhead housing;

an annular seal ring for use if the primary seal surface of the wellhead housing is damaged, comprising:

an upper seal surface in sealing contact with the seal surface of the wellhead connector;

a support section which is adjacent the primary seal surface in the wellhead housing and positioned to prevent sealing contact with the primary seal surface;

a conical lower seal surface extending below the support section, the lower seal surface being at the same inclination relative to the axis of the bore as the secondary seal surface of the wellhead housing and contacting the secondary seal surface in sealing engagement; and a rib extending radially outward from the conical surface into the recess.

10. The apparatus according to claim 9 wherein the lower seal surface of the seal ring terminates in a lower end that is spaced above the transition surface by a clearance.

11. The apparatus according to claim 9 wherein the upper seal surface of the seal ring is conical.

12. The apparatus according to claim 9 wherein the support section of the seal ring has an outer surface that is conical and at the same inclination relative to the axis of the bore as the primary seal surface.

13. The apparatus according to claim 9 wherein the seal ring has an inner diameter that is generally concave.

14. In a wellhead housing of a type having a bore having an axis and an upward facing shoulder on its upper end, a wellhead connector adapted to connect to the wellhead housing and having a bore and a downward facing shoulder for contact with the upward facing shoulder, the wellhead connector having a recess located radially inward from the downward facing shoulder and a conical surface which extends upward and 2 inward from the recess, an improved means for sealing the wellhead connector to the wellhead housing at the upward and downward facing shoulders, comprising in combination:

a primary seal surface extending downward and radially inward from the upward facing shoulder of the wellhead housing, the primary seal surface having a lower marginal edge;

a secondary seal surface extending downward from the lower marginal edge of the primary seal surface of the wellhead housing, the secondary seal surface intersecting the primary seal surface at an obtuse angle and having a lower marginal edge;

a transition surface extending inward from the lower marginal edge of the secondary seal surface to the bore of the wellhead housing;

an annular first seal ring for use in the event the primary seal surface of the wellhead housing is in good condition, comprising:

an upper conical surface which faces upward and outward for sealing contact with the conical surface of the wellhead connector;

a lower conical surface which faces downward and outward for sealing contact with the primary seal surface of the wellhead housing, the first seal ring having a lower edge adapted to terminate above the secondary seal surface in the wellhead housing; and a rib extending radially outward from the conical surfaces into the recess;

an annular second seal ring for use in lieu of the first seal ring in the event the primary seal surface of the wellhead housing is damaged, comprising:

an upper conical surface which faces upward and outward for sealing contact with the conical surface of the wellhead connector;

a support section which is adapted to be spaced adjacent the primary seal surface in a position to prevent sealing contact;

a lower seal surface extending below the support section for contacting the secondary seal surface in the wellhead housing in sealing engagement, the lower seal surface terminating in a lower end that is adapted to be spaced above the transition surface by a clearance; and a rib extending radially outward from the conical surface and the support section for location in the recess.

15. The apparatus according to claim 14 wherein the secondary seal surface is conical and at a lesser angle relative to the axis of the bore than the primary seal surface.

16. The apparatus according to claim 14 wherein the secondary seal surface is substantially cylindrical.

17. The apparatus according to claim 14 wherein the support section of the seal ring has an outer surface that is at the same inclination relative to the axis of the bore as the primary seal surface.

18. The apparatus according to claim 14 wherein the seal ring has an inner diameter that is generally concave.

19. A method of sealing a wellhead connector to a wellhead housing, the wellhead housing being of a type having a bore and an upward facing shoulder on its upper end, the wellhead connector being adapted to connect to the wellhead housing and having a bore and a downward facing shoulder for contact with the upward facing shoulder, the wellhead connector having a conical surface which extends upward and inward next to the downward facing shoulder, the method comprising in combination:

providing a primary seal surface extending downward and radially inward from the upward facing shoulder of the wellhead housing;

providing a secondary seal surface extending downward from the primary seal surface of the wellhead housing and intersecting the primary seal surface at an obtuse angle;

providing a first seal ring with outer upper and lower conical surfaces for use in the event the primary seal surface of the wellhead housing is in good condition;

placing the upper conical surface of the first seal ring in sealing contact with the conical surface of the wellhead connector;

placing the lower conical surface of the first seal ring in sealing contact with the primary seal surface of the wellhead housing; and providing a second seal ring for use in lieu of the first seal ring in the event the primary seal surface of the wellhead housing is damaged;

providing the second seal ring with an upper seal surface which faces upward and outward, a support section extending downward from the upper seal surface, and a lower seal surface extending below the support section;

placing the upper seal surface of the second seal ring in sealing contact with the conical surface of the wellhead connector;

positioning the support section adjacent the primary seal surface in the wellhead housing to prevent sealing of the support section at the primary seal surface; and placing the lower seal surface of the second seal ring in sealing contact with the secondary seal surface in the wellhead housing.

* * * * *

UNITED STATES PATENT AND TRADEMARK OFFICE
CERTIFICATE OF CORRECTION

PATENT NO. : 5,103,915

DATED : April 14, 1992

INVENTOR(S) : Thomas F. Sweeney, Karl Schnakenburg

It is certified that error appears in the above-identified patent and that said Letters Patent is hereby corrected as shown below:

At column 6, line 49, "2" should be deleted.

Signed and Sealed this

Twenty-eighth Day of September, 1993

Attest:

BRUCE LEHMAN

Attesting Officer

Commissioner of Patents and Trademarks